US009708539B2

(12) United States Patent
Terraz

(10) Patent No.: US 9,708,539 B2
(45) Date of Patent: Jul. 18, 2017

(54) STEEPING LIQUOR USED AS A MEANS OF CONTROLLING THE RISK OF FIRE AND EXPLOSION OF ORGANIC EXTRACTIVE MATERIALS

(75) Inventor: Denis Terraz, Castelnau le Lez (FR)

(73) Assignee: IEC EUROPE SARL, Luxembourg (LU)

(*) Notice: Subject to any disclaimer, the term of this patent is extended or adjusted under 35 U.S.C. 154(b) by 1045 days.

(21) Appl. No.: 13/388,486

(22) PCT Filed: Aug. 3, 2010

(86) PCT No.: PCT/FR2010/000563
§ 371 (c)(1),
(2), (4) Date: Apr. 10, 2012

(87) PCT Pub. No.: WO2011/018561
PCT Pub. Date: Feb. 17, 2011

(65) Prior Publication Data
US 2012/0186834 A1    Jul. 26, 2012

(30) Foreign Application Priority Data
Aug. 11, 2009  (FR) .................................... 09 03919

(51) Int. Cl.
E21F 3/00          (2006.01)
C09K 21/14         (2006.01)

(52) U.S. Cl.
CPC .................................... C09K 21/14 (2013.01)

(58) Field of Classification Search
CPC .................................... A62C 3/00; E21F 5/10
(Continued)

(56) References Cited

U.S. PATENT DOCUMENTS 4,060,489 A * 11/1977 Chiesa, Jr. ......................... 252/3
4,136,050 A *  1/1979 Brehm ....................... C21B 7/22
                                                                252/88.1
(Continued)

FOREIGN PATENT DOCUMENTS

DE    12 64 369 B    3/1968
DE    17 58 196 A1   1/1971
(Continued)

OTHER PUBLICATIONS

International Search Report, Jan. 11, 2011, from International Phase of the instant application.
(Continued)

Primary Examiner — Arthur O Hall
Assistant Examiner — Adam J Rogers
(74) Attorney, Agent, or Firm — Paul & Paul

(57) ABSTRACT

The invention relates to the use of a concentrated steeping liquor from the starch industry, referred to as corn steep, as a means for controlling the risks of fire caused by self-heating and the risks of explosion of dust caused by the particles and microparticles contained in the inflammable organic materials from the extractive industry, as well as by explosive gases released during the self-heating process during the storage, transport, and/or handling thereof. The concentrated steeping liquor of the invention is diluted with water and mixed with the material to be treated in respective proportions so as to obtain, for an index P up to 315 µm, a percentage of fines at most equal to 6%.

7 Claims, 2 Drawing Sheets

(58) Field of Classification Search
USPC .................................. 169/64, 45; 299/5, 13
See application file for complete search history.

(56) References Cited

U.S. PATENT DOCUMENTS

| | | | | |
|---|---|---|---|---|
| 4,582,511 | A * | 4/1986 | Siddoway | C10L 9/10 252/88.1 |
| 5,223,165 | A * | 6/1993 | Winstanley | C09K 3/22 252/88.1 |
| 7,157,021 | B2 * | 1/2007 | Bytnar | C09K 3/22 106/162.1 |
| 2006/0180786 | A1 | 8/2006 | Sapienza et al. | |
| 2009/0314983 | A1 * | 12/2009 | Sapienza et al. | 252/70 |
| 2012/0148347 | A1 * | 6/2012 | Borden | 405/128.5 |

FOREIGN PATENT DOCUMENTS

| | | | |
|---|---|---|---|
| FR | 2 874 022 A1 | | 2/2006 |
| GB | 1 492 238 A | | 11/1977 |
| IN | 1240DEL2008 A | * | 4/2010 |
| WO | WO 91/00866 A1 | | 1/1991 |

OTHER PUBLICATIONS

English Translation of International Preliminary Report on Patentability Chapter II, Feb. 11, 2012, from International Phase of the instant application.

* cited by examiner

STEEPING LIQUOR USED AS A MEANS OF CONTROLLING THE RISK OF FIRE AND EXPLOSION OF ORGANIC EXTRACTIVE MATERIALS

FIELD OF THE INVENTION

The invention relates to the use of a concentrated steeping liquor, called "corn steep", from the starch industry, as a means of countering the risks of fire caused by self-heating and the risks of dust explosion induced by the particles and microparticles contained in materials having flammable organic dusts from the extractive industry as well as by the explosive gases released during the process of self-heating during their storage, their transport and/or their handling.

TECHNOLOGICAL BACKGROUND

Materials from the extractive industry (mines, quarries, processing industries, etc.) are, when they are constituted by flammable organic materials, the cause of fires by self-heating related to the characteristics of these materials and explosions related to organic dusts brought about by such materials, and to the release of explosive gas as a result of self-heating during their storage, their transport and/or their handing.

Regarding limitation of dust emissions, various processes related to the protection of personnel as well as to respect for the environment have been developed.

Regarding limitation of explosion risks in the extractive industry of flammable organic materials, from products containing starch, document GB 1492238 can be cited, which describes, in the framework of coal mining operations from a coal seam, a method comprising an injection of product into holes drilled for the extraction of coal, in order to create a hydraulic fracture of the coal seam to partially eliminate the methane, oxidized by bacteria-based microbial action, and to moisten the dust, thereby reducing the dusts during the washing of coal. The aforementioned method uses a high viscosity aqueous composition comprising the indicated chemical products and starch. In addition, beyond the injection of the high viscosity product, the method in question adds compressed air, a solution of hydrochloric acid into the coal seam during the extraction, solution also heated preferably several hundreds of degrees, then a steam injection in order to remove the condensates.

In other words, an object of the aforementioned method is the elimination, in a heavy manner (high viscosity solution acting by bacterial action with additional injection of a solution of hydrochloric acid heated to several hundred degrees, then steam), the methane contained in the coal during the extraction, which has the effect of avoiding dusts during the extraction and washing.

Another document, WO9100866, describes, more particularly, the effect of an aqueous chemical composition designed to suppress the generation of dusts.

None of these documents addresses specific problems related to fire hazards caused by self-heating and the risk of explosion related to the fineness of the particles and more particularly microparticles of such materials, once extracted (dust explosion), with the risk of explosion caused by the release of explosive gas (carbon monoxide) as a result of self-heating (gas explosion) or with the risk of an explosion of a hybrid of gas and dust, during their storage, their transport and/or their handling.

On the other hand, for the prevention of such risks, various techniques for preventing and monitoring have been implemented without any of then, to date, having taken into account the fineness of particles of the materials and the binding of moisture by condensation which are the principal causes that can lead to a fire following a self-heating or an explosion of dust, gas, or hybrid (gas and dust).

The data enumerated below, which are necessary for the understanding of the scientific and experimental development that led to the discovery of unrecongnized characteristics related to concentrated steeping liquors, from the Final Report of the NERIS Convention CECA No. 7262/03/307/03 of 1996 entitled "Etude de sécurité incendie et explosion des installations houillères jour et sidérurgiques", as well as data from this same organization relating to organic materials releasing flammable dusts.

Analysis of the Phenomenon of Ignition by Self-Heating of Extractive Organic Materials Storage of coal and coke and, by extension: the organic materials of extractive origin, causes potential sources of fire resulting from self-heating of the products. This risk concerns the principal danger of this type of installation.

The phenomena of self-heating of coke and coal, essentially depend:
  on the critical dimension of the storage that is in most cases exceeded;
  on oxidation reactions taking place inside the product;
  on the initial temperature;
  on the binding of moisture.

If the rates of oxidation of coal or of coke are more or less low as a function of their reactivity, they, however, play an important role for large storage dimensions where the critical dimension is greatly exceeded. Moreover, this oxidation rate which progresses with temperature elevation, also increases when the grain size of the materials in storage decreases, since the specific adjustable surface area increases sharply in this case. Furthermore, the binding of moisture by condensation in storage heavily promotes the elevation of the storage temperature, which accelerates the oxidation phemonena and of course self-heating. In fact, a condensation of the order of approximately 1% moisture induces a substantial increase in temperature of approximately 20° C.

Generally, the triggering of a fire, for most coals or cokes, requires an additional energy input in the form of minimum ignition energy in order to overcome the barrier of activation energy of the system. To have a combustion, it is also necessary to achieve the minimum temperature at which the reaction with flame development will occur. This temperature is called the ignition temperature.

With high molecular weight substances such as coal or coke, the decomposition must first occur well before reaching the ignition temperature. These phenomena take a certain time called the induction period. One speaks of ignition only if a flame is visible.

The induction period is reduced when the temperature increases. It also depends on the pressure, the combustible concentration, the type of material, thus its reactivity and its contained additives. The higher the sample volume, the easier the heat buildup.

In order to avoid the risks associated with self-heating, it is thus appropriate to store coal or coke in amounts below the critical volume for a given deposition temperature, or to work under inert atmosphere. In reality, these two possibilities are not realized, the critical dimension being generally low (a few meters) and storage under an inert atmosphere is not conceivable for storage in the open air.

The rate of oxidation of coals or cokes at ambiant temperature is very low and does not play an effective role in the phenomenon of self-heating except for heaps of large dimensions and after a very long time. This is the time required to pass from the storage temperature of the coal or coke (ambiant temperature) to a temperature of approximately 70-80° C. beyond which the self-heating takes place.

Moreover, the oxidation rate increases as the grain size decreases. In fact, when the particle size decreases, the specific surface of grains increases and thus also the surface subject to reacting with the oxygen in the air.

The pyrite content is also a factor influencing the rate of oxidation. The presence of pyrite in the form of well dispersed small particles (large specific surface) promotes the self-heating while the presence of monolythic pyrite does not cause substantial increase in the heating rate.

However, such a reaction can serve to prime heating because pyrite oxidizes rapidly only in very humid atmosphere. From 80° C., it is likely that the coal dries quickly but the rate of oxidation of the coal itself has now reached a sufficient value for heating by chemical oxidation to continue.

Hence the importance, beyond the reactivity of coal and/or coke itself, of the fineness of the particles of coal or coke and the binding of moisture by condensation in the phenomenon of ignition by self-heating.

Analysis of the phenomenon of explosion of dusts or hybrid (gas and dusts) emitted by extractive organic material The explosion is a rapid combustion of a mixture of gas, coal dusts or both, with the air in a confined or partially confined space, wherein the heat released is greater than the heat lost in the environment.

In the industries associated with coal and similar materials, the explosions are associated with the presence of large quantities of dusts formed during the handling or the crushing of combustibles. Explosions can also be caused by pryolytic gas or incomplete combustion (carbon monoxide) formed during the self-heating of the coal deposit.

The energy released by a source of ignition primes the combustion of the particles nearby. Under the effect of this heat source, a pyrolysis of coal dusts then operates, generating volatile fuel that ignites. The reaction rates are high because the specific surface of the combustible is very substantial. If the cloud is sufficiently dense, the radiation and the convection heat the neighboring particles and the explosion thus propogates step by step.

The reactive mixture of air and coal particles "cold" (ambiant temperature) is transformed into combustion products "hot" (1200-2000° C.). The mixture of air particles that traverse the flame consequently undergoe a strong thermal expansion (the volume is multipled by at least 5 times). The expansion phenomenon is responsible for the observed pressure effects during an explosion in a confined or partially confined space.

In free atmosphere, in the case of stocks on the ground, only a fireball is observed with a very weak surge pressure, but with a large thermal effect. This is the "Flash".

In closed chamber, the pressure effects are much larger (maximum surge pressure of approximately 5 to 10 bar) and can lead to destruction of equipment.

One speaks then of explosion.

The explosion is a particular combustion realizing the following specific parameters:
 the dusts must be in suspension to form a large contact surface with air;
 the dust concentration must be sufficient (greater than the minimum explosible concentration);
 the atmosphere must be confined so that the pressure can increase.

In order to eliminate any risk of explosion, it suffices to eliminate one of the components involved in the phenomenon of combustion or ignition.

Beyond the characterizations of combustion and ignition of dusts necessary for an explosion of organic dusts to be able to take place, various conditions concerning the dusts and their fineness, as well as the concentration and the combustion of these dusts in an atmosphere more or less confined and especially in an enclosed environment, must be met.

Hence the importance of the fineness of the particles of coal or coke in the explosion phenomenon.

SUMMARY OF THE INVENTION

The tests were conducted using compositions containing vegetable proteins with the aim of selecting those capable, simultaneously:
 of increasing the grain size by durably agglomerating the particles and more particularly the microparticles of organic extractive products of the coal or coke types;
 of durably avoiding the binding of moisture by condensation by acting as wetting agent of the aforementioned particles and microparticles.

They also focused on compositions easy to obtain and apply and having a cost compatible with the considered application.

The tested compositions, based on vegetable proteins in liquid solution, have more particularly been chosen from steeping liquors from the starch industry and more particularly those from corn kernels according to a process that comprises adding sulfur dioxide ($SO_2$) during the steeping step enabling the release of the various constituent of corn (minerals, amino acids, phosphate, potash, . . . ) for, after concentration, obtaining a concentrated steeping liquor called "Corn Steep".

In order to investigate these fundamental characteristics, analyzes and tests were conducted for a period of 90 days, by the CEBTP-SOLEN Center for Studies and Tests of Montpellier, located at the Millennium, 685 Rue Louis Lépine, 34000 Montpellier over a period extending from Jul. to Sep. 2008.

The material that was selected, particularly subject to containing dusts and the risk of fire by self-heating, is petroleum coke.

The composition that was selected is "Corn Steep", concentrated steeping liquor, marketed by the ROQUETTE Company under the reference SOLULYS 048 E.

Its physical characteristics are: dry matter=48%, C/N=3.33, mineral matter=9.4%, organic matter=38.6%, pH=4.1, density=1.2 g/cm$^3$.

Its chemical characteristics are: total N=3.55%, $K_2O$ sol=3.05%, $P_2O_5$=3.63%, MgO=0.7%, Ca=0.03%, $SO_3$=0.005%.

This composition is currently used as:
 nitrogen and hydrocarbon source as support for development by fermentation of bacterial strains, producers of antibiotics, vitamins or amino acids and mushrooms;
 nitrogen source for the growth of plant species in the case of remediation of polluted soils or in the case of deforestation due to fires, and development along autoroutes;
 binder for the manufacture, particularly by extrusion, of feed and nutritional substance;
 granulation binder for the manufacture of fertilizer pellets and fertilizers;
 foliar fertilizer for fruit trees.

The tests have been made with the goal of searching for new and original characteristics related to possible durable wetting and agglomerating aspects in connection with the application concerned.

Excellent results were obtained by diluting the aforementioned steeping liquor with water and concentrating it by mixing the material to be treated in the respective proportions adapted to enable the acquisition, for a passing material "index P" up to 315 μm, of a percentage of smalls at most equal to 5%.

This result was obtained for:
a ratio of dilution with water between 2 and 8%;
a dosage ratio, relative to the material to be treated, between 3 and 12%.

The application of the tested composition on products from organic sources, such as coal or coke, enables a very strong reduction of the fire risks resulting from self-heating due to the durable agglomerating and wetting effect of the particles, increasing the grain size, reducing the condensation moisture binding and avoiding any massive increase in the temperature which helps to avoid internal oxidation phenomena, and therefore stops any effect of self-heating and explosion.

The application of the composition also leads to a very substantial reduction of environmental hazards, a reduction that can be followed by a decrease in means of prevention and control, a source of financial savings in particular as regards:
the orientation of ground stocks with respect to prevailing winds;
the effects of chimneys, which will be removed;
the compaction that can be avoided;
the inventory management that can be very lean;
the monitoring of stocks which can be reduced, especially as regards the temporal temperature controls.

The tested vegetable composition is a product containing water-soluble vegetable proteins from cereal or protein fats and/or steeping liquid generated by the starch industry.

This composition, wetting, natural, non toxic and biodegradable with liquid consistency, can be diluted with water with an ease of application usable in different application techniques such as spraying, misting, atomizing with adapted spreading means.

Used as a wetting agent and binder of mineral and/or organic particles and microparticles such as coal or coke for example, it enables a durable agglomeration over several months of the aforementioned particles and microparticles and increases the size of the fine grains.

The application of this composition, according to a certain ratio of dilution with water and a ratio of dosage in its application enables, over a period of several months:

a) with respect to the dangers of materials with flammable organic dusts such as coal or coke:
strongly reducing the risks of fire resulting from self-heating using a durable agglomeration of the particles increasing the size of the grains, reducing the binding of the condensation moisture and enabling prevention of a massive increase in temperature, which helps to prevent internal oxidation phenomena, and to stop any effect of self-heating and fire;
reducing the risks of explosion of dusts and/or gas resulting from the durable agglomeration of particles and microparticles and the increase of the grain size;
reducing the preventive measures implemented as part of fire prevention due to self-heating (orientation of stocks on the ground, chimney effect, compaction, stockage management, stockage tracking, . . . );
reducing the fire and explosion isolation distances determined in the framework of the hazard studies of the ICPE (Classified Installations for Environmental Protection);

b) with respect to dust:
reducing, even totally and durably eliminating, dusts lift off, contributing also to improved quality of ambient air;
minimizing the health effects caused by PM10 and above all PM2.5 present in the ambient air and especially with respect to organic coal and coke dusts;
complying with regulations and avoiding, in most cases, the mandatory annual declaration concerning pollutants, declaration that must be made from a threshold of 50 t/year for PM10 and a threshold of 150 t/year for total dust;
contributing to environmental protection by reducing the environmental nuisances and the effects or impacts caused on vegetation, agriculture, landscape, habitat and property, monuments and architectural heritage;

c) with respect to profitability:
reducing material losses resulting from windborne fly ash and handling, as well as waste;
minimizing the cost of monitoring, control and prevention;
obtaining financial gain can be a result, financial gain for the buyer of the formula (without taking into account cost reductions related to monitoring, control and prevention):
reducing, even eliminating, the costs of the T.G.A.P particles (General Tax on Polluting Activities) due to the broadening of the base T.G.A.P applicable in France since 1 Jan. 2009 and also in the European Community.

In summary:
the invention relates to activities after extraction, namely: storage, transport and/or handling;
the composition of the invention is not used during the extraction and is not used as a humectant during washing: it is used later during storage or handling and acts as a wetting agent, which gives it a durability lasting over several months, enabling avoidance of self-heating of the organic material (coal or coke) and dust lift off by its granulation effect due to the wetting agent character and not to the humidifying character of the document GB 1492238 and not the oxidation or the partial removal of methane.

In addition, the aforementioned document uses a high viscosity aqueous composition comprising the indicated chemical products and starch, while the composition of the invention uses natural and organic products from the starch industry.

The replacement of the composition used in the document GB 1492238 for this object of the invention, can not have the same effects during the extraction and would not for that matter have any effect since it also can act only on materials already extracted having more or less fine particle size, which is not the case of materials to be extracted, which are monolithic as in coal seams.

PRESENTATION OF THE FIGURES

The features and advantages of the invention will appear more clearly upon reading the detailed description that follows of at least one preferred implementation mode thereof given by way of non-limiting example and represented in the accompanying figures.

DETAILED DESCRIPTION OF THE INVENTION

The tests comprised:
a monitoring of progression of particle size, water content and apparent density of a control stock of treated materials situated on the right-of-way of the bulk terminal of the Port of South of France at Sète, over the period Jul.-Sep. 2008, by CEBTP/SOLEN of Montpellier, then by the inventor from Oct. 2008 to Jul. 2009 regarding the monitoring of temperatures, in order to ensure representative external conditions (the control stock representing a mass of approximately 50 t);
an optimization study enabling specification of the progression of the percentage of smalls and the apparent density by varying the percentage of the composition tested in a mixture diluted with water, then by varying the percentage of this mixture, referred to as dosage, relative to the quantity of treated material.

The progression monitoring focused more particularly on:
the water content;
the density;
the particle size.

The table below summarizes the monitoring data related to the water content (W) and the apparent density ($\rho$) with the application of the tested composition diluted to 5% of pure product and dosed at 10% on of the material, whose density was before treatment 0.720 t/m$^3$.

| PARAMETERS | PERIOD IN DAYS | | | | |
| --- | --- | --- | --- | --- | --- |
| | 8 | 15 | 30 | 60 | 90 |
| W in % | 5.70 | 7.10 | 7.0 | 5.80 | 6.10 |
| $\rho$ in t/m$^3$ | 0.859 | 0.857 | 0.805 | 0.809 | 0.810 |

With regard to this monitoring, it can be noted that:
the water content varied little;
the density remains substantially unchanged.

The following graphs visualize, as a function of time, the data from the particle size monitoring, whose passing material up to 315 μm, before the application of the tested composition, was 15% and that up to 80 μm at 7.7% (mixture diluted to 5% and dosed at 10%). It is complemented by the evaluation monitoring of the percentage of passing material up to 315 μm.

Particle Size Analysis of the Material

Figure 1:
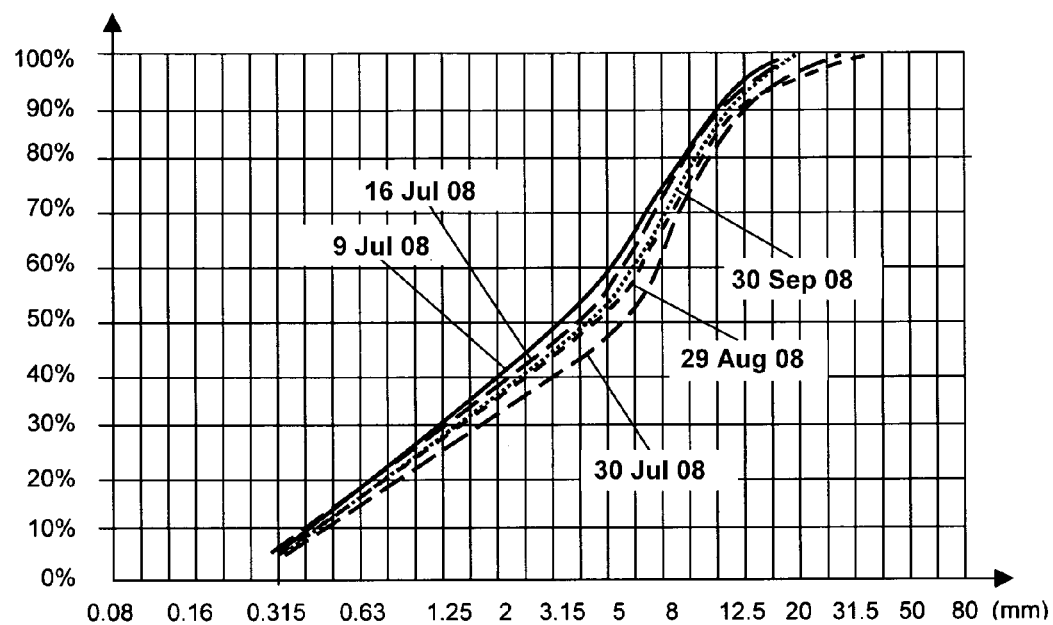
FIG. 1 is the graphical representation, at different periods of time, of the percentage of passing materials as a function of the opening of the sieve in mm.
Figure 2:
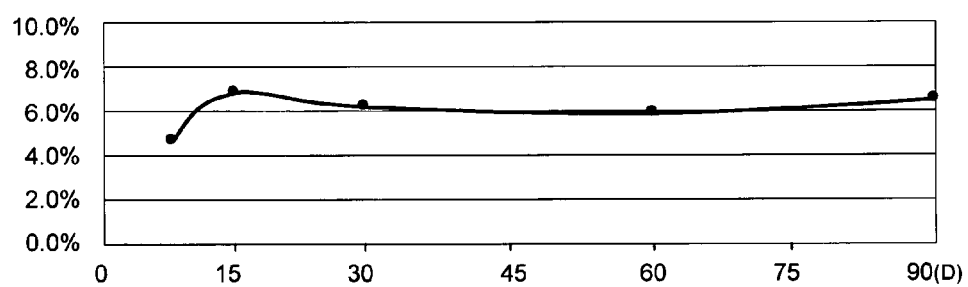
FIG. 2 is the graphical representation of the variation (in %), in time (days), of the passing material up to 0.315 mm.

FIG. 1 shows, at different periods of time, the percentage of passing material as a function of opening of the sieve in mm;

FIG. 2 shows the variation (in %), in time (days), of the passing material up to 0.315 mm.

The corresponding data are extracted from the following table:

| | 9 Jul. 2008 | 16 Jul. 2008 | 30 Jul. 2008 | 29 Aug. 2008 | 30 Sep. 2008 |
| --- | --- | --- | --- | --- | --- |
| passing material up to 0.315 mm | 4.7% | 6.6% | 6.1 | 6.1% | 6.4% |

With regard to this monitored granulometric, it clearly appears that the fine and very fine particles, below 315 microns, were agglomerated from the application of the tested composition, which acted as wetting agent and binder.

This agglomeration, whose advantage primarily concerns fine and very fine particles, focused:
principally: on fine and very fine particles having diameters less than 315 μm, whose passing material of the order of 6% remained virtually unchanged over 3 months at minimum;
secondarily: on much larger grains, going up to the size of 25 mm.

Subsequently, it can be shown that the application of the test composition enables durable binding, over multiple months, of fine and very fine particles, sources of dust lift off.

The optimization study enables specification of the progression of the percentage of smalls as a function of the ratio of dilution with water of the test composition and of the dosage of this diluted composition in the material to be treated.

This study, which focused on three ratios of dilution with water of the tested composition, with 3%, 5% and 7%, was carried out, at the end of three months, over the fraction 0/5 mm of the treated material (petroleum coke), the results of which have been adjusted to take into account the entirety of the treated material in all particle sizes.

The graph table below shows this optimization where it can be observed that the curves corresponding to the dilution ratio of 3% and 5% tend to join when the dosage ratio increases (blue: 3%, red: 5% and green: 7%).

Figure 3:
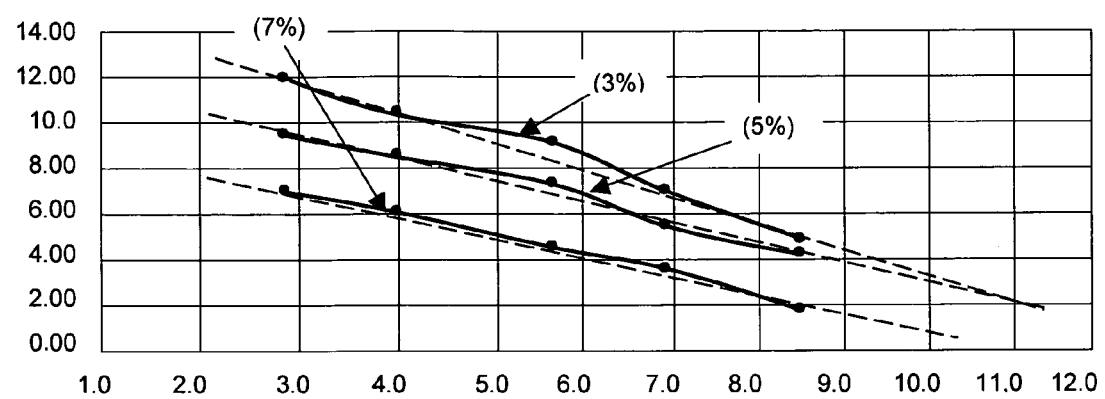
FIG. 3 is the graphical representation, with different dilution ratios (3, 5, and 7%), of the passing material up to 0.315 mm (in corrected values at the ratio of 45.6%) as a function of the percentage of solution over fraction 0/Dmax.

FIG. 3 is the graphical representation, with different dilution ratios (3, 5, and 7%), of the passing material up to 0.315 mm (corrected values at the ratio of 45.6%) as a function of the percentage of solution over fraction 0/Dmax.

The graph in question is complemented by the following table which summarizes the corrected data rounded in the polynomial form: P=ad+b, where P is the passing material in %, d the dosage in % and b a constant of the optimization study as a function of the dilution ratio, for example: 11.50=−0.991+12.491 for d=1, at the dilution ratio of 5%.

| Dosage of the diluted mixture on the material (d) | DILUTION RATIO OF THE TESTED COMPOSITION | | |
| --- | --- | --- | --- |
| | 3% P: passing material up to 315μ in % | 5% P: passing material up to 315μ in % | 7% P: passing material up to 315μ in % |
| 1 | 14.20 | 11.50 | 9.00 |
| 2 | 12.97 | 10.51 | 8.03 |
| 3 | 11.75 | 9.52 | 7.06 |
| 4 | 10.53 | 8.53 | 6.09 |
| 5 | 9.30 | 7.54 | 5.13 |
| 6 | 8.08 | 6.55 | 4.16 |
| 7 | 6.85 | 5.55 | 3.19 |
| 8 | 5.63 | 4.65 | 2.22 |
| 9 | 4.41 | 3.57 | 1.26 |

-continued

| Dosage of the diluted mixture on the material (d) | DILUTION RATIO OF THE TESTED COMPOSITION | | |
|---|---|---|---|
| | 3% P: passing material up to 315µ in % | 5% P: passing material up to 315µ in % | 7% P: passing material up to 315µ in % |
| 10 | 3.18 | 2.85 | 0.29 |
| 11 | 1.96 | 1.59 | 0.00 per 10.3 |
| 12 | 0.73 | 0.60 | — |
| 12.6 | 0.00 | 0.00 | — |
| linear form | P = −1.224 d + 15.422 | P = −0.991 d + 12.491 | P = −0.968 d + 9.968 |

These tests show that:
the passing material up to 315 µm and the mixture dosages are proportional irrespective of the dilution ratios of the composition;
for dilution ratios of 3% and 5%, the results are essentially identical from 7% of mixture in the product where the passing materials up to 315µ are of the order of 6% to attain approximately 0% to 12.6% of mixture;
the dilution ratio of 7%, enables very substantial improvement of the results, the 7% passing materials of the mixture being on the order 3% to attain 0 to 10.3% of mixture;
a dilution ratio of 6% can be extrapolated without difficulty: it is of the polynomial form: P=−0.952 d+10.952, with a passing material up to 315µ of 0 for a dosage of 11.5%, and a passing material of less than 3% to 7% of mixture.

The application of the tested composition has the advantages:
durable agglomerating of the particles and microparticles, which enables increase of the grain size as was demonstrated above;
avoiding moisture binding by condensation, the tested composition, diluted between 5 to 7% with water, acting as wetting agent and binder, agglomerating the particles and microparticles, thereafter avoiding this moisture binding.

In order to verify these elements, the internal temperatures of the stocks were noted in a stock of petroleum coke treated with the test composition and a stock of untreated petroleum coke. This verification, the data of which are repeated in table below, speaks for itself, the temperature of the treated stock not having varied (temperatures tracked detected at more than 1 m in the interior of the stocks during the months of Jul. 2008 to Jul. 2009).

| Date | Bulk coke T in ° C. | Treated coke T in ° C. |
|---|---|---|
| 1 Jul. 2008 | 165 | 45 |
| 8 Jul. 2008 | 165 | 45 |
| 15 Jul. 2008 | 160 | 44.5 |
| 22 Jul. 2008 | 155 | 48.3 |
| 29 Jul. 2008 | 125 | 31.5 |
| 5 Aug. 2008 | 150 | 34.5 |
| 12 Aug. 2008 | 145 | 34.5 |
| 19 Aug. 2008 | 150 | 33 |
| 26 Aug. 2008 | 160 | 30 |
| 2 Sep. 2008 | 115 | 28.8 |
| 9 Sep. 2008 | 130 | 30 |
| 16 Sep. 2008 | 120 | 35 |
| 23 Sep. 2008 | 150 | 25 |
| 30 Sep. 2008 | 142 | 40 |
| 8 Oct. 2008 | 120 | 22 |
| 15 Oct. 2008 | 122 | 20 |
| 22 Oct. 2008 | 130 | 23 |
| 29 Oct. 2008 | 145 | 22 |
| 5 Nov. 2008 | 140 | 23 |
| 12 Nov. 2008 | 95 | 25 |
| 23 Dec. 2008 | 110 | 20 |
| 29 Jan. 2009 | 117 | 17 |
| 27 Feb. 2009 | 105 | 16 |
| 25 Mar. 2009 | 110 | 15 |
| 30 Apr. 2009 | 117 | 17 |
| 22 May 2009 | 103 | 22 |
| 23 Jun. 2009 | 105 | 24 |
| 28 Jul. 2009 | 100 | 26 |

According an implementation variation of the invention, the diluted steeping liquor will be mixed with black soap (oil+alkaline solution) in order to increase the wetting properties of the composition.

The corresponding proportion will not exceed 5%.

Of course, the person skill in the art will be able to carry out the invention as described and shown by applying and adapting known means. He will also be able to also foresee other variations without departing from the scope of the invention which is determined by the terms of the claims.

The invention claimed is:

1. A method consisting of mixing a solution comprising corn steep and water with a mass of coal or coke once extracted from a mine, in order to counter risks of fire caused by self-heating and risks of explosion of dust caused by the particles and microparticles contained in the coal or coke as well as explosive gas released by a self-heating process, during subsequent storage, transport or handling of the coal or coke, wherein the mixture of corn steep, water and mass of coal or coke has a passing "index P" up to 315 µm, with a percentage of smalls at most equal to 6%.

2. A method-of countering risks of fire or explosion of coal or coke, according to claim 1, consisting of preparing said solution by diluting corn steep with water with a ratio of dilution with water between 2 and 8%.

3. A method of countering risks of fire or explosion of coal or coke, according to claim 2, consisting of mixing said solution with a dosage ratio, relative to the material to be treated, of between 3 and 12%.

4. A method of countering risks of fire or explosion of coal or coke according to claim 2, further including subsequently transporting or handling a mixture of the diluted solution and the coal or coke.

5. A method consisting of mixing a solution comprising corn steep and water with a mass of coal or coke once extracted from a mine, in order to counter risks of fire caused by self-heating and risks of explosion of dust caused by the particles and microparticles contained in the coal or coke as well as explosive gas released by a self-heating process, during subsequent storage, transport or handling of the coal or coke, wherein the mixing step is carried out with a dosage ratio, relative to the material to be treated, of between 3 and 12%.

6. A method according to claim 5, wherein the mixture of corn steep, water and mass of coal or coke has a passing "index P" up to 315 µm, with a percentage of smalls at most equal to 6%.

7. A method according to claim 5, further including subsequently transporting or handling a mixture of the diluted solution and the coal or coke.

* * * * *